United States Patent [19]

Kielhorn-Bayer et al.

[11] Patent Number: 5,369,177
[45] Date of Patent: Nov. 29, 1994

[54] UV-STABILIZED POLYOXYMETHYLENE MOLDING MATERIALS

[75] Inventors: Sabine Kielhorn-Bayer, Maxdorf; Hartmut Zeiner; Heiner Goerrissen, both of Ludwigshafen; Dietrich Saenger, Frankenthal, all of Germany

[73] Assignee: BASF Aktiengesellschaft, Ludwigshafen, Germany

[21] Appl. No.: 113,094

[22] Filed: Aug. 30, 1993

[30] Foreign Application Priority Data

Sep. 5, 1992 [DE] Germany ................ 4229760

[51] Int. Cl.$^5$ ............... C08L 59/02; C08L 59/04
[52] U.S. Cl. ..................... 525/154; 524/86; 524/182; 524/287; 525/132; 525/179; 525/529
[58] Field of Search ........... 525/154, 179, 529, 132; 524/86, 182, 287

[56] References Cited

U.S. PATENT DOCUMENTS

| | | | |
|---|---|---|---|
| 3,210,318 | 10/1965 | Dolce et al. | 260/45.8 |
| 3,306,953 | 2/1967 | Fourcade et al. | 260/857 |
| 3,960,984 | 6/1976 | Kohan | 260/857 |
| 4,863,877 | 9/1989 | Gugumus | 524/97 |

FOREIGN PATENT DOCUMENTS 171941 2/1986 European Pat. Off. .
368635 5/1990 European Pat. Off. .
448037 9/1991 European Pat. Off. .

OTHER PUBLICATIONS

Derwent Publications (abstracts) AN 88-267162/38 (English abstract of JP63193-950).
Derwent Publications (abstracts) AN 85-286263/46 (English abstract of JP 60195-155).
Derwent Publications (abstracts) AN 21608W/13 (English abstract of JP 49099-739), Sep. 1924.

*Primary Examiner*—James J. Seidleck
*Assistant Examiner*—W. Robinson H. Clark
*Attorney, Agent, or Firm*—Keil & Weinkauf

[57] ABSTRACT

Thermoplastic molding materials contain
A) from 40 to 99.69% by weight of a polyoxymethylene homo- or copolymer,
B) from 0.1 to 2% by weight of at least one stabilizer selected from the group consisting of benzotriazole derivatives or benzophenone derivatives or aromatic benzoate derivatives,
C) from 0.1 to 2% by weight of at least one sterically hindered amino compound,
D) from 0.005 to 2% by weight of a polyamide,
E) from 0 to 2% by weight of an epoxy-containing compound,
F) from 0 to 50% by weight of a toughened polymer and
G) from 0 to 50% by weight of a fibrous or particulate filler or of a mixture thereof.

6 Claims, No Drawings

UV-STABILIZED POLYOXYMETHYLENE MOLDING MATERIALS

The present invention relates to thermoplastic molding materials containing
A) from 40 to 99.69% by weight of a polyoxymethylene homo- or copolymer,
B) from 0.1 to 2% by weight of at least one stabilizer selected from the group consisting of the benzotriazole derivatives or benzophenone derivatives or aromatic benzoate derivatives,
C) from 0.1 to 2% by weight of at least one sterically hindered amino compound,
D) from 0.005 to 2% by weight of a polyamide,
E) from 0 to 2% by weight of an epoxy-containing compound,
F) from 0 to 50% by weight of a toughened polymer and
G) from 0 to 50% by weight of a fibrous or particulate filler or of a mixture thereof.

The present invention furthermore relates to the use of such molding materials for the production of moldings of any type, and the moldings thus obtained.

Polyoxymethylene homo- and/or copolymers have long been known. The polymers have a number of excellent properties so that they are suitable for a very wide range of industrial applications. Particularly in the automotive sector, there is a need for UV-stabilized polyoxymethylenes, the requirements being very high particularly in the case of exterior parts.

Consequently, there has been no lack of attempts to find agents for improving the UV stability.

According to EP-A 368 635, POM molding materials which contain a sterically hindered phenol having triazine functionality possess improved UV stability.

Stabilizer combinations comprising high molecular weight polyalkylpiperidines for thermoplastics are described in EP-A 252 877.

According to EP-A 448 037, sterically hindered oxopiperazyltriazine-based amines are used for the UV-stabilization of POM.

EP-A 171 941 and JP-A 60/195 155 and 63/193 950 disclose combinations of sterically hindered amines and benzotriazole compounds for POM.

Heat stabilizers, in particular polyamides, are disclosed in, inter alia, EP-A 446 737 and US-A 3 960 989.

JP-A 49/99 739 discloses ethylene diglycidyl ether as a heat stabilizer for colored, reinforced POM molding materials.

In spite of these measures, however, known polyoxymethylene molding materials have inadequate UV stability for certain applications, leading to an insufficient life of the moldings.

It is an object of the present invention to improve the UV stability of polyoxymethylene molding materials and hence to minimize the tendency to yellow.

We have found that this object is achieved by the thermoplastic polyoxymethylene molding materials defined at the outset, as claimed in claim 1.

Preferred materials of this type are described in the subclaims.

The novel molding materials contain, as component A), from 40 to 99.69, preferably from 60 to 99.3, in particular from 70 to 98.7, % by weight of a polyoxymethylene homo- or copolymer.

Copolymers of this type are known to the skilled worker and are described in the literature.

Very generally, these polymers have at least 50 mol % of repeating units —$CH_2O$— in the polymer main chain.

The homopolymers are generally prepared by polymerizing formaldehyde or trioxane, preferably in the presence of suitable catalysts.

For the purposes of the present invention, polyoxymethylene copolymers are preferred as component A), in particular those which, in addition to the repeating units —$CH_2O$—, also contain up to 50, preferably from 0.1 to 20, in particular from 0.3 to 10, mol % of repeating units

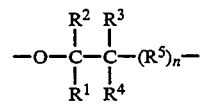

where $R^1$ to $R^4$ independently of one another are each hydrogen, $C_1$-$C_4$-alkyl or halogen-substituted alkyl of 1 to 4 carbon atoms, $R^5$ is —$CH_2$—, —$CH_2O$— or a $C_1$-$C_4$-alkyl- or $C_1$-$C_4$-haloalkyl-substituted methylene group or a corresponding oxymethylene group and n is from 0 to 3. These groups can be advantageously introduced into the copolymers by ring cleavage of cyclic ethers. Preferred cyclic ethers are those of the formula

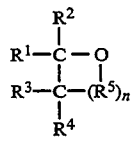

where $R^1$ to $R^5$ and n. have the abovementioned meanings. Merely by way of example, ethylene oxide, 1,2-propylene oxide, 1,2-butylene oxide, 1,3-butylene oxide, 1,3-dioxane, 1,3-dioxolan and 1,3-dioxepan may be mentioned as cyclic ethers and linear oligoformals or polyformals, such as polydioxolan or polydioxepan, may be mentioned as comonomers.

Other suitable components A) are oxymethylene terpolymers, which are prepared, for example, by reacting trioxane and one of the cyclic ethers described above with a third monomer, preferably a bifunctional compound of the formula:

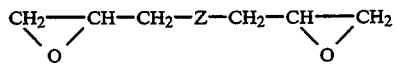

where Z is a chemical bond, —O— or —ORO— and R is $C_1$-$C_8$-alkylene or $C_2$-$C_8$-cycloalkylene.

Preferred monomers of this type are ethylenediglycide, diglycidyl ether and diethers of glycidyl compounds and formaldehyde, dioxane or trioxane in a molar ratio of 2:1 and diethers of 2 mol of glycidyl compound and 1 mol of an aliphatic diol of 2 to 8 carbon atoms, for example the diglycidyl ether of ethylene glycol, 1,4-butanediol, 1,3-butanediol, cyclobutane-1,3-diol, 1,2-propanediol or cyclohexane-1,4-diol, to mention but a few examples.

Processes for the preparation of the homo- and copolymers described above are known to the skilled worker and are described in the literature, so that no further information is required here.

Preferred polyoxymethylene copolymers have melting points of at least 150° C. and weight average molecular weights Mw of from 5,000 to 200,000, preferably from 7,000 to 150,000.

Polyoxymethylene polymers which are stabilized at terminal groups and have C—C bonds at the chain ends are particularly preferred.

The novel molding materials contain, as component B), from 0.1 to 2, preferably from 0.2 to 1.5, in particular from 0.2 to 1, % by weight of at least one stabilizer selected from the group consisting of benzotriazole derivatives or benzophenone derivatives or aromatic benzoate derivatives.

Suitable benzotriazole derivatives are:

2-(2-hydroxy-5-methylphenyl)-benzotriazole,
2-(2-hydroxy-3,5-di-tert-butylphenyl)-benzotriazole,
2-(3,5-di-tert-amyl-hydroxyphenyl)-benzotriazole,
2-(2'-hydroxy-3',5'-diisoamylphenyl)-benzotriazole,
2-[2'-hydroxy-3',5'-bis(1,1-dimethyl)-benzyl)phenyl]-benzotriazole,
2-(2'-hydroxy-4-octyloxyphenyl)-benzotriazole,
2-(2H-benzotriazole-2-yl)-4-(1,1,3,3-tetramethylbutyl)-phenol,
2-(2H-benzotriazole-2-yl)-2,4-(tert-butyl)-phenol,
2-(2H-benzotriazole-2-yl)-4-(1,1-dimethylethyl)-6-(1-methylpropyl)-phenol and
2-(2H-benzotriazole-2-yl)-4,6-bis(1,1-dimethylpropyl)-phenol.

Compounds of this type are commercially available under the name Tinuvin ® (registered trade mark of Ciba Geigy AG).

Preferred benzophenone derivatives are:

2,4-dihydroxybenzophenone,
2-hydroxy-4-methoxybenzophenone,
2-hydroxy-4-octyloxybenzophenone,
2-hydroxy-4-dodecyloxybenzophenone,
2,2-dihydroxy-4-methoxybenzophenone,
2,2-dihydroxy-4,4-dimethoxybenzophenone,
2-hydroxy-4-methoxy-5-sulfobenzophenone and
2-hydroxy-4-oxybenzylbenzophenone p-tert-Butylphenyl salicylate and p-octylphenyl salicylate may be mentioned as examples of aromatic benzoate derivatives.

The novel molding materials contain, as component C), from 0.1 to 2, preferably from 0.2 to 1.5, in particular from 0.2 to 1, % by weight of at least one sterically hindered amino compound. Compounds of the formula I

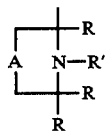

where R are identical or different alkyl radicals, R' is hydrogen or alkyl and A is an unsubstituted or substituted 2- or 3-membered alkylene chain, are preferred.

Preferred components C) are derivatives of 2,2,6,6-tetramethylpiperidine, such as 4-acetoxy-2,2,6,6-tetramethylpiperidine,
4-stearoyloxy-2,2,6,6-tetramethylpiperidine,
4-acryloyloxy-2,2,6,6-tetramethylpiperidine,
4-methoxy-2,2,6,6-tetramethylpiperidine,
4-benzoyloxy-2,2,6,6-tetramethylpiperidine,
4-cyclohexyloxy-2,2,6,6-tetramethylpiperidine,
4-phenoxy-2,2,6,6-tetramethylpiperidine,
4-benzyloxy-2,2,6,6-tetramethylpiperidine and
4-(phenylcarbamoyloxy)-2,2,6,6-tetramethylpiperidine.

Bis(2,2,6,6-tetramethyl-4-piperidyl) oxalate,
bis(2,2,6,6-tetramethyl-4-piperidyl) malonate,
bis(2,2,6,6-tetramethyl-4-piperidyl) adipate,
bis(2,2,6,6-tetramethyl-4-piperidyl) sebacate,
bis(1,2,2,6,6-pentamethylpiperidyl) sebacate,
bis(2,2,6,6-tetramethyl-4-piperidyl) terephthalate,
1,2-bis (2,2,6,6-tetramethyl-4-piperidyloxy)ethane,
bis(2,2,6,6-tetramethyl-4-piperidyl) hexamethylene-1,6-dicarbamate,
bis(1-methyl-2,2,6,6-tetramethyl-4-piperidyl) adipate and
tris(2,2,6,6-tetramethyl-4-piperidyl) benzene-1,3,5-tricarboxylate
are also suitable.

Furthermore, relatively high molecular weight piperidine derivatives, such as the dimethyl succinate polycondensate with 4-hydroxy-2,2,6,6-tetramethyl-1-piperidylethanol or poly 6-(1,1,3,3-tetramethylbutyl)amino-1,3,5-triazine-2,4-diyl(2,2,6,6-tetramethyl-4-piperidinyl)imino-1,6-hexanediyl(2,2,6,6-tetramethyl-14-piperidinyl)imino, are suitable.

Compounds of this type are commercially available under the name Tinuvin ® or Chimasorb ® (registered trade marks of Ciba Geigy AG).

The polyamides which can be used as components D) are known per se. Semicrystalline or amorphous resins, as described, for example, in Encyclopedia of Polymer Science and Engineering, Vol. 11, pages 315 to 489, John Wiley & Sons, Inc. 1988, may be used, the melting point of the polyamide preferably being less than 225° C., particularly preferably less than 215° C.

Examples of these are polyhexamethyleneazelaamide, polyhexamethylenesebacamide, polyhexamethylenedodecanediamide, poly-11-aminoundecanamide and bis-(p-aminocyclohexyl)-methanedodecanediamide or the products obtained by ring cleavage of lactams, e.g. polylaurolactam. Polyamides based on terephthalic or isophthalic acid as the acid component and/or trimethylhexamethylenediamine or bis(p-aminocyclohexyl)-propane as the diamine component and polyamide base resins which have been prepared by copolymerizing two or more of the abovementioned polymers or components thereof are also suitable.

Copolyamides based on caprolactam, hexamethylenediamine, p,p'-diaminodicyclohexylmethane and adipic acid may be mentioned as particularly suitable polyamides. An example of these is the product sold under the name Ultramid ® 1C by BASF Aktiengesellschaft.

Further suitable polyamides are sold by Du Pont under the name Elvamide ®.

The preparation of these polyamides is likewise described in the abovementioned publication. The ratio of terminal amino groups to terminal acid groups can be controlled by varying the molecular ratio of the starting compounds.

The amount of the polyamide in the novel molding material is from 0.005 to 2, preferably from 0.01 to 1, in particular from 0.02 to 0.9, % by weight.

The novel molding materials can contain, as component E), from 0 to 2, preferably from 0.1 to 2, particularly preferably from 0.2 to 1.5, in particular from 0.2 to 1, % by weight of an epoxy-containing compound.

According to the invention, epoxy-containing compounds are to be understood as meaning monomeric and oligomeric (poly)condensates of halogenated epoxides, preferably epichlorohydrin, with aromatic, aliphatic or cycloaliphatic alcohols or carboxylic acids of up to 30, preferably up to 20, carbon atoms or cyanuric acid.

Preferred compounds are epoxy resins (polycondensates) of 2,2-di-(4-hydroxyphenyl)-propane (bisphenol A) and epichlorohydrin:

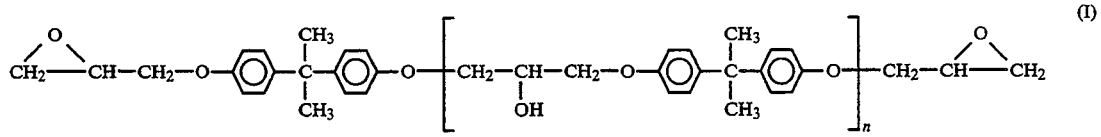

where n is from 0 to 25.

Such products are commercially available under the name Phenoxy ® (registered trade mark of Union Carbide Corporation) or Epikote ® (Shell).

Further preferred compounds are glycidyl ethers of cresol and epichlorohydrin, glycidyl ethers of aliphatic alcohols of up to 14 carbon atoms and epichlorohydrin, epoxy resins based on

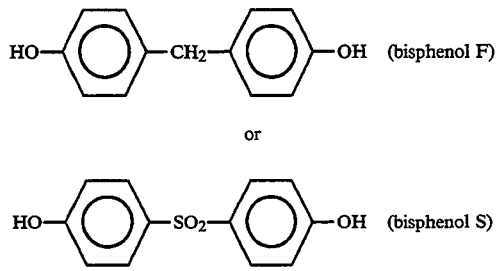

with epichlorohydrin, where the molecular weight of the polycondensates may vary within wide limits; in principle, the commercially available types are all suitable.

In addition, epoxidized soybean oil and glycidyl esters, such as

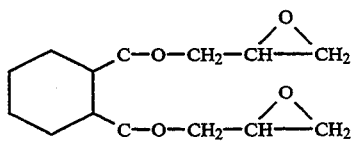

are suitable, triglycidyl isocyanurate

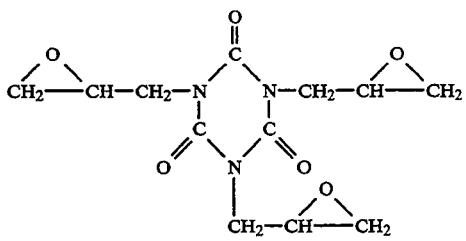

being particularly preferred.

The compounds present as component (E) preferably have an epoxide number of from 0.1 to 15, preferably from 0.3 to 11, equivalents/kg, which is determined in general according to DIN 16,945 (Method A or B).

The novel thermoplastic molding materials contain, as component F), from 0 to 50, preferably from 0 to 40, % by weight of a toughened polymer (also referred to below as elastomeric polymer or elastomer).

Preferred types of such elastomers are the ethylene/propylene (EPM) or ethylene/propylene/diene (EPDM) rubbers.

EPM rubbers generally have virtually no more double bonds, whereas EPDM rubbers may have from 1 to 20 double bonds/100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadiene, cyclooctadiene and dicyclopentadiene, and alkenylnorbornenes, such as 5-ethylidene-2-norbornene, 5-butylidene-2-norbornene, 2-methallyl-5-norbornene or 2-isopropenyl-5-norbornene and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 1 to 8, % by weight, based on the total weight of the rubber.

The EPDM rubbers can also be grafted with further monomers, for example with glycidyl (meth)acrylates, (meth)acrylates and (meth)acrylamides.

A further group of preferred rubbers comprises copolymers of ethylene with esters of (meth)acrylic acid. The rubbers may furthermore contain epoxy-containing monomers. These epoxy-containing monomers are preferably incorporated in the rubber by adding to the monomer mixture epoxy-containing monomers of the general formula I or II

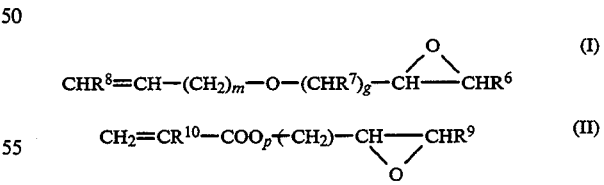

where $R_6$–$R^{10}$ are each hydrogen or alkyl of 1 to 6 carbon atoms, m is an integer of from 0 to 20, g is an integer of from 0 to 10 and p is an integer of from 0 to 5.

$R^6$ to $R^8$ are each preferably hydrogen, m being 0 or 1 and g being 1. The corresponding compounds are allyl glycidyl ethers and vinyl glycidyl ethers.

Preferred compounds of the formula II are epoxy-containing esters of acrylic acid and/or mothacrylic acid, such as glycidyl acrylate and glyoidyl methacrylate.

Advantageously, the copolymers consist of from 50 to 98% by weight of ethylene and from 0 to 20% by weight of epoxy-containing monomers, the remaining amount comprising (meth)acrylates.

Copolymers of
from 50 to 98, in particular from 55 to 95, % by weight of ethylene, in particular from 0.3 to 20% by weight of glycidyl acrylate, and/or
from 0 to 40, in particular from 0.1 to 20, % by weight of glycidyl methacrylate and
from 1 to 50, in particular from 10 to 40, % by weight of n-butyl acrylate and/or 2-ethylhexyl acrylate are particularly preferred.

Further preferred esters of acrylic and/or mothacrylic acid are the methyl, ethyl, propyl, isobutyl and tert-butyl esters.

Vinyl esters and vinyl ethers may also be used as comonomers.

The ethylene copolymers described above can be prepared by conventional processes, preferably by random copolymerization under high pressure and at elevated temperatures. Corresponding processes are generally known.

Other preferred elastomers are emulsion polymers whose preparation is described, for example, by Blackley in the monograph Emulsion Polymerization. The emulsifiers and catalysts which can be used are known per se.

In principle, homogeneous elastomers or those having a shell structure may be used. The shell-like structure is determined by the order of addition of the individual monomers; the morphology of the polymers is also influenced by this order of addition.

Acrylates, e.g. n-butyl acrylate and 2-ethylhexyl acrylate, corresponding methacrylates, butadiene, isoprene and mixtures thereof are mentioned here merely as typical examples of monomers for the preparation of the rubber component of the elastomers. These monomers can be copolymerized with further monomers, for example styrene, acrylonitrile, vinyl ethers and further acrylates or methacrylates, such as methyl methacrylate, methyl acrylate, ethyl acrylate and propyl acrylate.

The flexible or rubber phase (having a glass transition temperature of less than 0° C.) of the elastomers may be the core, the outer shell or the middle shell (in the case of elastomers having a structure comprising more than two shells); in multi-shell elastomers, it is also possible for a plurality of shells to consist of a rubber phase.

If one or more rigid components (having glass transition temperatures of more than 20° C.) are also present in the elastomer in addition to the rubber phase, said rigid components are generally prepared by polymerizing styrene, acrylonitrile, methacrylonitrile, α-methylstyrene, p-methylstyrene, acrylates and methacrylates, such as methyl acrylate, ethyl acrylate and methyl methacrylate, as main monomers. Here too, smaller amounts of further comonomers may also be used.

In certain cases, it has proven advantageous to use emulsion polymers which have reactive groups at the surface. Such groups are, for example, epoxy, amino or amido groups as well as functional groups which can be introduced by the concomitant use of monomers of the general formula

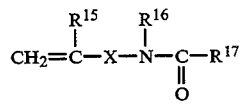

where $R^{15}$ may be hydrogen or $C_1$–$C_4$-alkyl, $R^{16}$ may be hydrogen, $C_1$–$C_8$-alkyl or aryl, in particular phenyl, $R^{17}$ may be hydrogen, $C_1$–$C_{10}$-alkyl, $C_6$–$C_{12}$-aryl or —$OR^{18}$, $R^{18}$ may be $C_1$–$C_8$-alkyl or $C_6$–$C_{12}$-aryl, each of which may be unsubstituted or substituted by O- or N-containing groups, X may be a chemical bond, $C_1$–$C_{10}$-alkylene or $C_6$–$C_{12}$-arylene or

Y may be O—Z— or NH—Z— and Z may be $C_1$–$C_{10}$-alkylene or $C_6$–$C_{12}$-arylene.

The graft copolymers described in EP-A 208 187 are also suitable for introducing reactive groups to the surface.

Acrylamide, methacrylamide and substituted esters of acrylic acid or methacrylic acid, such as (N-tert-butylamino)ethyl methacrylate, (N,N-dimethylamino)ethyl acrylate, (N,N-dimethylamino)methyl acrylate and (N,N-diethylamino)ethyl acrylate, may also be mentioned as further examples.

Furthermore, the particles of the rubber phase may also be crosslinked. Examples of crosslinking monomers are buta-1,3-diene, divinylbenzene, diallyl phthalate and dihydrodicyclopentadienyl acrylate, as well as the compounds described in EP-A 50 265.

Graft-linking monomers may also be used, i.e. monomers having two or more polymerizable double bonds which react at different rates in the polymerization. Preferably used compounds are those in which at least one reactive group polymerizes at about the same rate as the other monomers while the other reactive group (or reactive groups) polymerizes (polymerize), for example, substantially more slowly. The different polymerization rates result in a certain proportion of unsaturated double bonds in the rubber. If a further phase is subsequently grafted onto such a rubber, some or all of the double bonds present in the rubber react with the graft monomers with formation of chemical bonds, i.e. the phase grafted on is partially or completely linked to the grafting base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate or the corresponding monoallyl compounds of these dicarboxylic acids. There is also a large number of further suitable graft-linking monomers; for further details, reference may be made here to, for example, U.S. Pat. No. 4,148,846.

In general, the amount of these crosslinking monomers in component F) is up to 5, preferably not more than 3, % by weight, based on F).

Some preferred emulsion polymers are shown below. Graft polymers which have a core and at least one outer shell and the following structure may be initially mentioned here:

| Monomers for the core | Monomers for the shell |
|---|---|
| Buta-1,3-diene, isoprene, n-butyl acrylate, ethylhexyl acrylate or mixtures thereof, if necessary together with crosslinking monomers | Styrene, acrylonitrile, (meth)acrylates, if necessary with reactive groups as described herein |

Instead of graft polymers having a multishell structure, homogeneous, i.e. one-shell, elastomers of buta-1,3-diene, isoprene and n-butyl acrylate or copolymers thereof may also be used. These products too can be prepared by the concomitant use of crosslinking monomers or monomers having reactive groups.

The elastomers F) described may also be prepared by other conventional processes, for example by suspension polymerization.

Further preferred rubbers are polyurethanes as described in EP-A 115846, EP-A 11847, EP-A 116456, EP-A 117664 and EP-A 327384. Such products are commercially available, for example, under the names Desmopan ® (Bayer AG) or Elastollan ® (Elastogran Polyurethane GmbH).

Mixtures of the abovementioned rubber types can of course also be used.

The novel molding materials may contain, as component G), from 0 to 50, preferably from 5 to 40, % by weight of a fibrous or particulate filler or of a mixture thereof.

Examples of reinforcing fillers are potassium titanate whiskers, carbon fibers and preferably glass fibers, where the glass fibers can be used, for example, in the form of woven glass fabrics, glass mats, glass surface mats and/or glass rovings or cut glass filaments of low-alkali E glass having a diameter of from 5 to 200 μm, preferably form 8 to 50 μm, and the fibrous fillers preferably have an average length of from 0.05 to 1 mm, in particular from 0.1 to 0.5 mm, after they have been incorporated.

Other suitable fillers are, for example, wollastonite, calcium carbonate, glass spheres, quartz powder, silicon nitride and boron nitride or mixtures of these fillers.

In addition to the components A), B), C) and D) and, if required, E), F) and G), the novel molding materials may furthermore contain conventional additives and processing assistants. Formaldehyde scavengers, plasticizers, lubricants, antioxidants, adhesion promoters, light stabilizers and pigments may be mentioned here merely by way of example. The amount of such additives is in general from 0.001 to 5% by weight.

In a preferred embodiment, the novel molding materials may contain a melamine/formaldehyde condensate as a nucleating agent. Suitable products are described in, for example, DE 25 40 207.

Corresponding compounds are known to the skilled worker and are described in, for example, EP-A 327 384.

The novel thermoplastic molding materials are prepared by mixing the components in a conventional manner, so that detailed information is unnecessary here. Mixing of the components is advantageously carried out in an extruder.

The novel thermoplastic molding materials have a balanced property spectrum, in particular very good UV stability and a pale natural color. Accordingly, they are particularly suitable for the production of fibers, films and moldings of any type.

EXAMPLES

The following components were used:

Component A

Polyoxymethylene copolymer comprising 97.3% by weight of trioxane and 2.7% by weight of butanediolformal. The product also contained about 3% by weight of unconverted trioxane and 5% by weight of thermally unstable components. After degradation of the latter, the copolymer had a melt flow index of 9 g/10 min (190° C. 2.16 N, according to ISO 1133).

Component B
1. Tinuvin ® 234 from Ciba Geigy AG 2-(2'-Hydroxy-3',5'-di-(1,1-dimethylbenzyl)phenyl)benzotriazole
2. Tinuvin ® 329 from Ciba Geigy AG 2-(2H-Benzotriazol-2-yl)-4-(1,1,3,3-tetramethylbutyl)phenol
3. Tinuvin ® 320 from Ciba Geigy AG 2-(2H-Benzotriazol-2-yl)-2,4-tert-butylphenol Component C
1. Tinuvin ® 622 LD from Ciba Geigy AG Dimethyl succinate polymer with 4-hydroxy-2,2,6,6-tetramethyl-1-piperidylethanol
2. Tinuvin ® 770 DF from Ciba Geigy AG Bis (2,2,6,6-tetramethyl-4-piperidyl) sebacate
3. Chimasorb ® 944 LD from Ciba Geigy AG Poly 6-(1,1,3,3-tetramethylbutyl) amino-1,3, 5-triazine-2,4-diyl- (2,2,6,6-tetramethyl-14-piperidinyl) imino-1,6-hexanediyl- (2,2,6, 6-tetramethyl-14-piperidinyl)imino Component D
1. Polyamide having an $M_w$ of 5,000, prepared from 37% by weight of ε-caprolactam and 63% by weight of an equimolar mixture of adipic acid and hexamethylenediamine using propionic acid as a regulator (PA mono-capped).
2. A copolyamide based on 29.2% by weight of caprolactam, 34.5% by weight of an equimolar mixture of hexamethylenediamine and adipic acid and 36.3% by weight of an equimolar mixture of p,p'-diaminodicyclohexylmethane and adipic acid, having a viscosity number of 120 ml/g, measured in 0.5% strength by weight solution in concentrated sulfuric acid at 25° C. according to DIN 53,727 (Ultramid ® 1C from BASF AG).
3. Polyamide oligomer having a molecular weight of about 3,000, prepared from caprolactam, hexamethylenediamine, adipic acid and acetic acid (as molecular weight regulator) according to Example 5-4 of US-A 3 960 984 (PA dicapped).

Component E

Araldit ® PT 810 from Ciba Geigy AG:

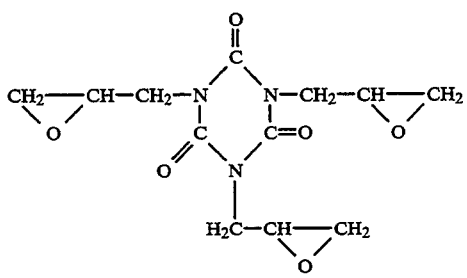

Epoxide number: $\geq 9.3$ eq/kg

For the preparation of the molding materials, the components were introduced into a twin-screw extruder having a devolatilization apparatus (ZSK 28 from Werner & Pfleiderer), homogenized at 230° C. and devolatilized, and the homogenized mixture was extruded through a die and granulated.

The following were determined for testing the UV stability: Injection molded test specimens produced at 200° C. were weathered in an Atlas Weather Ometer by the methods of the Society of Automotive Engineers (SAE) according to J 1885 for 900 hours. Thereafter, the gloss was determined according to DIN 67,530, as a percentage of the initial value of the unweathered samples.

Composition of the molding materials:

|    | TABLE 1         | TABLE 2         |
|----|-----------------|-----------------|
| A) | 98.96% by weight | 98.46% by weight |
| B) | 0.5% by weight  | 0.5% by weight  |
| C) | 0.5% by weight  | 0.5% by weight  |
| D) | 0.04% by weight | 0.04% by weight |
| E) |                 | 0.5% by weight  |

The results of the measurements are shown in the Tables.

TABLE 1

|              | Comp. B) | Comp. C) | Comp. D) | Gloss [%] |
|--------------|----------|----------|----------|-----------|
| Novel Examples |          |          |          |           |
| 1.           | 1        | 1        | 1        | 19        |
| 2.           | 1        | 2        | 1        | 20        |
| 3.           | 2        | 2        | 1        | 18        |
| 4.           | 2        | 1        | 1        | 18        |
| 5.           | 3        | 3        | 1        | 17        |
| 6.           | 1        | 1        | 2        | 25        |
| 7.           | 1        | 2        | 2        | 22        |
| 8.           | 2        | 2        | 2        | 20        |
| 9.           | 2        | 1        | 2        | 18        |
| 10.          | 3        | 3        | 2        | 19        |
| 11.          | 1        | 1        | 3        | 20        |
| 12.          | 1        | 2        | 3        | 19        |
| 13.          | 2        | 2        | 3        | 17        |
| 14.          | 2        | 1        | 3        | 19        |
| 15.          | 3        | 3        | 3        | 21        |
| Comparative Examples |    |          |          |           |
| A.           | 1        | 1        | —        | 7         |
| B.           | 1        | 2        | —        | 9         |
| C.           | 2        | 2        | —        | 5         |
| D.           | 2        | 1        | —        | 7         |
| E.           | 3        | 3        | —        | 4         |
| F.           | —        | —        | 1        | 0         |
| G.           | —        | —        | 2        | 0         |
| H.           | —        | —        | 3        | 0         |
| I.           | —        | 1        | 1        | 11        |
| K.           | 1        | —        | 1        | 10        |

These Examples clearly show the synergistic effect of polyamide, UV absorber B) and HALS compound C). Examples 1 to 5, 6 to 10 and 11 to 15 contain the same polyamide in combination with various UV absorbers B) and HALS compounds C). All samples clearly show more advantageous stabilities than the Examples A to K which are not according to the invention. Samples which contain neither UV absorber nor HALS compounds and only polyamide have very poor gloss (Comparative Examples F, G and H). These samples have no gloss even after 200 hours. The combinations of polyamide and UV absorber or polyamide and HALS compound (Comparative Examples I and K) have unsatisfactory gloss compared with the three-component combination.

TABLE 2

|              | Comp. B) | Comp. C) | Comp. D) | Comp. E) | Gloss [%] |
|--------------|----------|----------|----------|----------|-----------|
| Novel Examples |        |          |          |          |           |
| 16.          | 1        | 1        | 1        | +        | 35        |
| 17.          | 1        | 2        | 1        | +        | 29        |
| 18.          | 2        | 2        | 1        | +        | 32        |
| 19.          | 2        | 1        | 1        | +        | 34        |
| 20.          | 3        | 3        | 1        | +        | 32        |
| 21.          | 1        | 1        | 2        | +        | 39        |
| 22.          | 1        | 2        | 2        | +        | 34        |
| 23.          | 2        | 2        | 2        | +        | 32        |
| 24.          | 2        | 1        | 2        | +        | 35        |
| 25.          | 3        | 3        | 2        | +        | 33        |
| 26.          | 1        | 1        | 3        | +        | 38        |
| 27.          | 1        | 2        | 3        | +        | 34        |
| 28.          | 2        | 2        | 3        | +        | 39        |
| 29.          | 2        | 1        | 3        | +        | 38        |
| 30.          | 3        | 3        | 3        | +        | 37        |
| Comparative Examples |  |          |          |          |           |
| L.           | 1        | 1        | —        | +        | 11        |
| M.           | 1        | 2        | —        | +        | 10        |
| N.           | 2        | 2        | —        | +        | 8         |
| O.           | 2        | 1        | —        | +        | 12        |
| P.           | 3        | 3        | —        | +        | 13        |
| Q.           | 1        | 1        | 1        | —        | 19        |
| R.           | 1        | 2        | 1        | —        | 20        |
| S.           | 2        | 2        | 1        | —        | 18        |
| T.           | 2        | 1        | 1        | —        | 18        |
| U.           | 3        | 3        | 1        | —        | 17        |
| V.           | 1        | —        | 1        | +        | 13        |
| W.           | —        | 1        | 1        | +        | 15        |
| X.           | —        | —        | 1        | +        | 0         |
| Z.           | —        | —        | —        | +        | 0         |

The novel Examples 16 to 30 show the substantially improved UV stability of the Araldit-containing samples in relation to the Comparative Examples Q to U which contain no Araldit but do contain UV absorber B), HALS compound C) and polyamide D).

We claim:
1. A thermoplastic molding material containing
   A) from 40 to 99.69% by weight of a polyoxymethylene homo- or copolymer,
   B) from 0.1 to 2% by weight of at least one stabilizer selected from the group consisting of the benzotriazole or benzophenone or aromatic benzoate compounds,
   C) from 0.1 to 2% by weight of at least one sterically hindered amino compound,
   D) from 0.005 to 2% by weight of a polyamide,
   E) from 0 to 2% by weight of an epoxy-containing compound,
   F) from 0 to 50% by weight of an elastomeric polymer and
   G) from 0 to 50% by weight of a fibrous or particulate filler or of a mixture thereof.
2. A thermoplastic molding material as claimed in claim 1, containing
   A) from 40 to 99.69% by weight,
   B) from 0.1 to 2% by weight,
   C) from 0.1 to 2% by weight,
   D) from 0.005 to 2% by weight and
   E) from 0.1 to 2% by weight.
3. A thermoplastic molding material as claimed in claim 1, in which the component C) is a 2,2,6,6-tetramethylpiperidine compound.
4. A thermoplastic molding material as claimed in claim 1, in which the component E) is a (poly)conden- sate which is obtained from 2,2-di-(4-hydroxyphenyl)-propane (bisphenol A) and epichlorohydrin and is of the formula
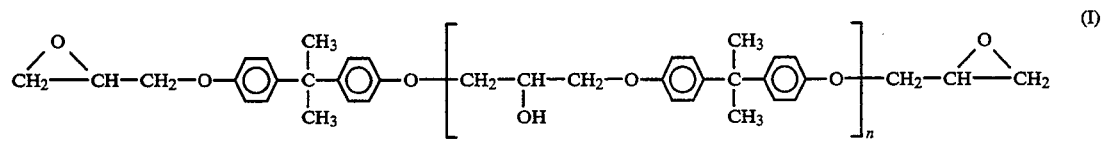
where n is from 0 to 25.
5. A thermoplastic molding material as claimed in claim 1, in which the component E) is trigiycidyl isocyanurate.
6. A molding produced from a thermoplastic molding material as claimed in claim 1.
* * * * *

UNITED STATES PATENT AND TRADEMARK OFFICE
CERTIFICATE OF CORRECTION

PATENT NO. : 5,369,177
DATED : November 29, 1994
INVENTOR(S) : Kielhorn-Bayer et al.

It is certified that error appears in the above-indentified patent and that said Letters Patent is hereby corrected as shown below:

Claim 1, column 12, line 45:
delete "the"

Claim 5, column 14, line 1:
"trigiycidyl" should read -- triglycidyl --

Signed and Sealed this

Thirty-first Day of January, 1995

*Attest:*

BRUCE LEHMAN

*Attesting Officer*     *Commissioner of Patents and Trademarks*